Patented May 23, 1933

1,910,244

UNITED STATES PATENT OFFICE

CLARENCE L. HAUTHAWAY, OF NEWTON, MASSACHUSETTS

PROCESS OF DISPERSING RUBBER OR RUBBER-LIKE SUBSTANCES

No Drawing.   Application filed June 2, 1931.   Serial No. 541,661.

The invention relates to dispersions of rubber or rubber-like substances and the process of producing such dispersions.

In rubber dispersions heretofore practised many of the dispersions were accomplished by heat, frictional and disruptive force, stretching, or kneading, all of which tend to injure the strength of the rubber, and the injury may be slight or very serious according to the extent of friction, heat and disruptive force used upon the rubber.

Many of the rubber dispersions heretofore practised include the use of a solvent for the rubber as one of the initial steps. This, however, is a more or less expensive proceeding, and a thing to be avoided if possible.

No process has been attained in which vulcanization takes place during the process of dispersion. Vulcanization of rubber latex or dispersions of rubber have been accomplished but under most exacting conditions of pressure and long-continued heat because sulphur in any of its forms will not react readily with the rubber particles when in water dispersion, high pressure and continued heat for long periods of time are necessary for each rubber particle to contact and combine with the sulphur.

In all dispersions of which I am aware the particle size of the rubber in the dispersion is so large that it absolutely unfits the rubber for many uses in which native rubber latex can be used, as for example, in connection with the impregnation of paper, in which the native latex owing to its small particle size can be used in so far as capability of penetration is concerned, yet the latex rubber is apt to quickly deteriorate and has little ability to withstand the action of heat, oils and other factors tending to bring about deterioration. In many cases it would be much better if the rubber in the native latex could be vulcanized, but it cannot be vulcanized, owing to the presence of the high percentage of water, without the influence of long-continued heat and pressure, even if vulcanization can successfully be brought about at all.

It is accordingly the object of my invention to obviate the difficulties above referred to and—

To obtain a dispersion of rubber or rubber-like substances in a manner which will not injure the rubber or rubber-like substance and in a manner as economical as possible;

To provide a dispersion in which the rubber or rubber-like substance is completely vulcanized, partly vulcanized, or unvulcanized as may be desired;

To provide a dispersion in which the rubber or rubber-like substance has a particle size substantially that of native rubber latex; and To provide a dispersion in which the rubber or rubber-like substance will, when used, withstand high heat and long aging without deterioration.

The initial step on which the present invention of dispersion is based is the reduction of the rubber or rubber-like substance from a solid to a molten state. In the case of rubber this is accomplished by adding to the rubber other substances such as resins miscible with it which, with the application of heat, have the effect of lowering the melting point of the rubber, thus bringing the rubber into a molten state without excessive injury from too high a temperature. In the case of rubber-like substances such as balata and gutta-percha, sufficient natural resins are found in many grades to allow melting them without any further additions of substances to lower their melting point. It is known to those skilled in the art just what the melting point of any rubber or rubber-like substance may be. It is also known to those skilled in the art or can easily be determined what amount of heat will injure the rubber or rubber-like substance. It accordingly becomes only necessary to add such resin or substance for lowering the melting point below that temperature which injures the rubber or rubber-like substance.

In practice I have found that rubber or rubber-like substances can be melted to a state of fluidity at a sufficiently low temperature to avoid injury by heating, if the resin content of the mass be at least 65 per cent. In other words, assuming the combined weight of the rubber or rubber-like substance together with that of the resin be a given amount, then the resin content should be at least 65 per cent. of the total mass. Many rubber-like substances or pseudo rubbers (such as balata, gutta-percha, guttasiack, pontianac, etc.) contain 65 per cent. or more of resin and these will melt at such sufficiently low temperature as will not necessitate the addition of further free resin, or but little free resin, as they have in themselves a high resin content, and this should be taken into consideration in determining the amount of free resin, if any, to be added to the mass.

Instead of adding free resin a proper resin content can be obtained by combining with a rubber or pseudo rubber having a low resin content, a gum of low rubber or gutta content (such as special Peruvian gum) but with a high resin content in quantities such that the combined mass will have its percentage of resin brought up to, or above, 65 per cent.

In some cases to obtain certain beneficial results as high as 90 per cent. of resin is sometimes advantageous and other results which are beneficial to the working qualities of the finished product are obtained by using even less than 65 per cent. of resin in the melting, and using a higher temperature to obtain the melt. In other words, using a temperature that is higher than the ideal one to obtain the melt, and therefore doing some damage to the rubber or pseudo rubber, may produce less damage to the finished product than does the use of sufficient resin to lower the melting point to or below the ideal temperature for melting.

The rubber or rubber-like substance having been brought by melting to a state of fluidity, water dispersion is then brought about by surrounding in the presence of water the individual particles of rubber or rubber-like substance with an agent which will act to keep the rubber particles apart. In practice the dispersion is made as follows: A soap-forming acid such as oleic, stearic, abietic, etc. is added to the molten bath in which it thoroughly dissolves; an alkali, such as caustic soda, is then added which forms with the acid previously added a soap in intermolecular contact with the rubber or rubber-like substance; water is then stirred in and a dispersion of the rubber or rubber-like substance results, the soap acting as a protective colloid surrounding the individual particles and preventing them from adhering to each other and thus coagulating. Additional protective colloids, (such as gelatine) gums, (such as karaya) colloidal clays, (such as bentonite) etc., may be added for giving body and stability and helping in dispersion, and may be used in place of soap, and preservatives, also, may be added, (such as phenol).

The following is an example formula of a water dispersion to be brought about by the present process of refined Brazilian balata (45 per cent. resin):

| | |
|---|---|
| Balata | 10 lbs. |
| Cumar resin | 8 lbs. |
| Oleic acid | 5 pts. |
| Caustic soda | 9 oz. |
| Glue chips | 10 oz. |
| Ammonia 26° | 9 oz. |
| Phenol | 1 oz. |

Build to 5 gallons with water.

If it is desired to obtain a vulcanized or partly vulcanized rubber dispersion, the rubber or rubber-like substance in the molten state is treated with sulphur which is used in whatever amounts are necessary to produce the desired degree of vulcanization. Because of the molten condition of the rubber, or rubber-like substance, vulcanization of the rubber is much more rapid and complete than when the sulphur is milled into solid rubber, or added to a water dispersion of rubber, and furthermore the molten bath is so reactive that no accellerators are necessary, and less sulphur is required for any degree of vulcanization.

The aqueous dispersion of the vulcanized rubber is accomplished the same as with the unvulcanized rubber as above pointed out.

The example formula previously given is the same with the exception of the addition to the mass of 1 lb. of sulphur (flour).

By the term "rubber" as used herein is meant to include rubber proper and rubber-like substances or gums.

Having thus fully described my invention, I claim and desire to secure by Letters Patent of the United States:—

1. The process of making an aqueous dispersion of rubber which comprises melting solid rubber in the presence of resin not appreciably less than 65 per cent of the combined weight of rubber and resin, whereby the melting point of the rubber will be lowered to a point where the melting of the rubber may be accomplished at a temperature which will cause no substantial injury to it, and dispersing the melted rubber in water by means of a dispersing agent.

2. The process of making an aqueous dispersion of rubber which comprises melting solid rubber in the presence of added resin in an amount such that the added resin will constitute not appreciably less than 65 per cent. of the weight of the rubber and resin in the combined mass, and dispersing the melted rubber in water by means of a dispersing agent.

3. The process of making an aqueous dispersion of rubber which comprises combining solid rubbers having respectively high and low resinous contents such that the resin will constitute not appreciably less than 65 per cent of the total weight of rubber and resinous content, whereby the melting of the rubber in the combined mass may be accomplished at a temperature which will cause no substantial injury to it, melting the rubbers in the combined mass, and dispersing the melted rubber in water by means of a dispersing agent.

4. The process of making an aqueous dispersion of rubber with a minimum of heat and without subjecting the same to frictional disruptive forces tending to injure the strength of the rubber, which consists in melting solid rubber with resin present in an amount to constitute from as high as approximately 90 per cent of the combined weight to approximately 65 per cent of such weight, but sufficient to lower the melting point of the rubber to a temperature at which there will be no substantial injury to the rubber, dissolving a soap-forming acid in the molten bath and adding an alkali to form with the acid a soap in substantially inter-molecular contact with the rubber, and adding water under agitation to form the dispersion.

5. The process of making an aqueous dispersion of rubber with a minimum of heat and without subjecting the same to frictional disruptive forces tending to injure the strength of the rubber, which consists in melting solid rubber with resin present in an amount to constitute from as high as approximately 90 per cent of the combined weight to approximately 65 per cent of such weight, but sufficient to lower the melting point of the rubber to a temperature at which there will be no substantial injury to the rubber, vulcanizing the rubber in its molten condition, dissolving a soap-forming acid in the molten bath and adding an alkali to form with the acid a soap in substantially inter-molecular contact with the rubber, and adding water under agitation to form the dispersion.

CLARENCE L. HAUTHAWAY.